US005649466A

United States Patent [19]
Genovese

[11] Patent Number: 5,649,466
[45] Date of Patent: Jul. 22, 1997

[54] METHOD OF RAPIDLY DEPLOYING VOLUME-DISPLACEMENT DEVICES FOR RESTRAINING MOVEMENT OF OBJECTS

[75] Inventor: James A. Genovese, Street, Md.

[73] Assignee: The United States of America as represented by the Secretary of the Army, Washington, D.C.

[21] Appl. No.: 370,586

[22] Filed: Jan. 5, 1995

Related U.S. Application Data

[63] Continuation of Ser. No. 981,446, Nov. 25, 1992, abandoned.

[51] Int. Cl.$^6$ ................................................ F42B 12/58
[52] U.S. Cl. .................. 89/1.11; 102/293; 102/354; 102/489; 102/529
[58] Field of Search ...................... 89/1.11; 142/293, 142/348, 354, 357, 393, 489, 502, 529, 530, 531

[56] References Cited

U.S. PATENT DOCUMENTS

| | | | |
|---|---|---|---|
| 2,834,606 | 5/1958 | Bertrand | 280/730 |
| 3,109,607 | 11/1963 | Lally | 102/348 |
| 3,419,134 | 12/1968 | Fitts | 53/472 |
| 3,626,854 | 12/1971 | Brooks | 102/348 |
| 3,791,667 | 2/1974 | Haviland | 280/730 |
| 3,981,518 | 9/1976 | Pulling | 280/730 |
| 4,541,947 | 9/1985 | Clark et al. | 252/307 |
| 4,706,990 | 11/1987 | Stevens | 280/734 |
| 5,031,929 | 7/1991 | Henseler | 280/730 |
| 5,249,527 | 10/1993 | Schwind | 89/1.11 |

FOREIGN PATENT DOCUMENTS

| | | | |
|---|---|---|---|
| 4108477 | 9/1992 | Germany | 280/728 |

*Primary Examiner*—Harold J. Tudor
*Attorney, Agent, or Firm*—John E. Callaghan; Ulysses John Biffoni

[57] ABSTRACT

Rapidly deployable restraining systems and methods for rendering personnel, animals and other objects immobile includes an assembly of confinement devices housed in a dispersion package. Each confinement device has a propellant, a primer and an inflatable bag that is rapidly inflated by the propellant when fired by the primer. A detonator, located in the package, is discharged to open the package, disperse the confinement devices and cause the primers to be energized, thereby inflating the bags. The package is pre-emplaced in a target area or it is projected into the area via a fired projectile of which it is a part.

5 Claims, 5 Drawing Sheets

5,649,466

METHOD OF RAPIDLY DEPLOYING VOLUME-DISPLACEMENT DEVICES FOR RESTRAINING MOVEMENT OF OBJECTS

This application is a continuation of application Ser. No. 07/981,446, filed Nov. 25, 1992 now abandoned.

The invention described herein may be manufactured, used and licensed by or for the United States Government.

BACKGROUND OF THE INVENTION

1. Field of the Invention

This invention relates to restraining systems and methods for passively immobilizing objects. More particularly, the invention relates to volume-displacement systems and methods that use rapidly deployable inflatable devices for temporarily rendering personnel, animals and other objects immobile.

2. Description of the Prior Art

Current law enforcement capabilities for immobilizing perpetrators of hostile or other inappropriate action include the use of riot control chemical dispensers, grenades and canisters. The use of such dispensers to deploy riot control material such as tear gas or Mace is a preferred immobilizing technique. A less-desirable alternative is the use of extreme force via firearms and the like. However, although riot control materials, such as tear gas, have served the purpose, they have not proved entirely satisfactory under all conditions of service because they do not always accomplish the desired results. The effects of such riot control materials on personnel are unpredictable, ranging anywhere from having little or no effect to inducing hyperactive responses. In some extreme cases, the use of lethal force becomes necessary even though its use is seldom condoned by most law enforcement officials. Even the use of less-than-lethal extreme forces e.g., via a policeman's club, a high-powered water hose, rubber bullets, etc., is currently not acceptable in most law enforcement scenarios and is not physically viable in most confined areas.

Consequently, those concerned with the development of personnel-restraining systems for use in riot control have long recognized the need for a less-than-lethal restraining technique capable of rapid deployment and effective operation in close quarters or confined areas. Ideally, the technique would be dependable, would be useful in a wide variety of environments and would be easily deployed to produce reasonably predictable results. The present invention fulfills this need.

SUMMARY OF THE INVENTION

The general purpose of this invention is to provide object-restraining systems and methods which embrace all the advantages of currently employed techniques and possess none of the aforedescribed disadvantages. To attain this, the present invention contemplates a unique inflation system that is capable of providing near-instantaneous restraint of personnel, animals and other objects so that the number of countermeasures and degree of resistance are significantly reduced, thereby minimizing the likelihood of unnecessary personal or collateral damage.

In summary, the present invention is directed to an object-restraining method that includes placing a plurality of expandable restraining elements in an area, dispersing the elements in the area, and then expanding the elements to restrain objects located in the area. The present invention also includes an object-restraining system having a plurality of restraining elements with each element including a deployable volume-displacement device that rapidly increases its volumetric size when deployed. A package containing the elements is placed in an area. A deployment mechanism causes the elements to be ejected from the package and be dispersed over the area and deploys the volume-displacement devices.

More specifically, the invention, directed to rapidly deployable restraining systems and methods for rendering personnel, animals and other objects immobile, includes an assembly of confinement devices housed in a dispersion package. Each confinement device has a propellent, a primer and an inflatable bag that is rapidly inflated by the propellent when fired by the primer. A detonator, located in the package, is discharged to open the package, disperse the confinement devices and cause the primers to be energized, thereby inflating the bags. The package is pre-emplaced in a target area or it is projected into the area via a fired projectile of which it is a part.

It is, therefore, an object of the present invention to provide a rapidly deployable, passive immobilization/restraint technique for effective use in close quarters or confined areas.

Another object is the provision of a less-than-lethal restraint system that can be pre-emplaced in an area to be protected or can be selectively inserted or projected into a designated area from a safe distance.

A further object of the invention is to provide an effective means for denying or impeding access to secure or sensitive areas.

Still another object is to provide a rapid and effective damage-mitigating technique that may be used to control the motion of explosively propelled objects such as bullets, munition fragments, ruptured machine parts and the like.

Yet another object of the present invention is the provision of a highly predictable, safe and effective restraint technique for the temporary immobilization of personnel, animals and other objects, thereby rendering it useful in a wide variety of fields such as law enforcement, security, safety, animal care, machine maintenance and repair, etc.

The exact nature of this invention as well as other objects and advantages thereof will be readily apparent from consideration of the following specification relating to the annexed drawing.

DETAILED DESCRIPTION OF THE PREFERRED EMBODIMENT

Figure 1A:
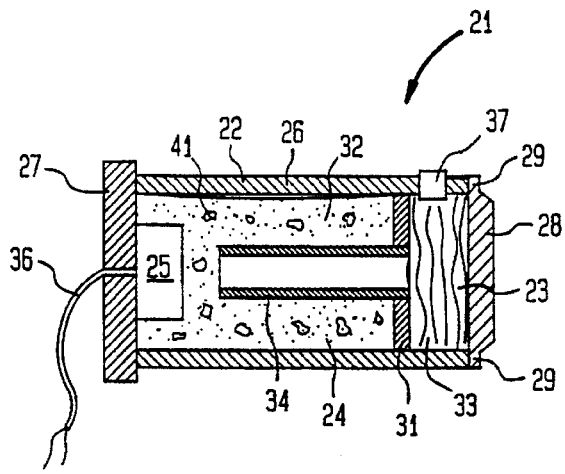
FIG. 1A is a cross-sectional elevation of a preferred embodiment before deployment.
Figure 1B:
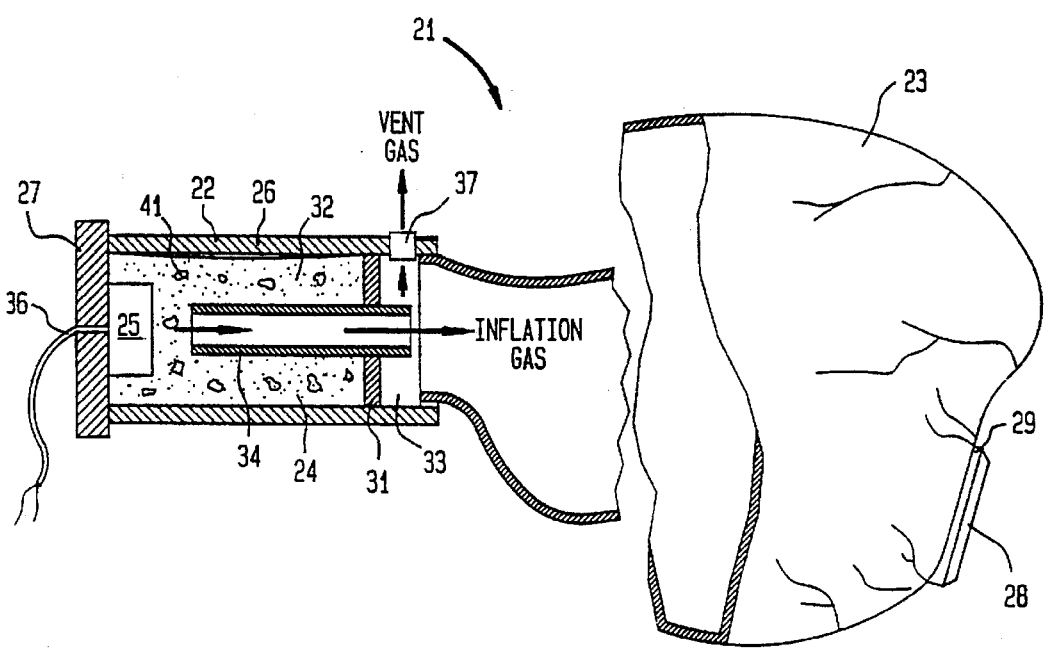
FIG. 1B is a cross-sectional elevation of the device shown in FIG.1A immediately after deployment.

Referring now to the drawings, there is shown in FIGS. 1A and 1B an inflatable confinement device 21 having a housing 22 for containing an inflatable bag 23, a propellant 24 and a propellant primer 25. FIG. 1A illustrates device 21 in the uninflated position with bag 23 compactly folded in housing 22. FIG. 1B shows device 21 as it is being deployed, i.e., with the inflating bag 23 extending from one end of housing 22. Device 21 is generally similar to a conventional automobile air-bag safety device.

Housing 22 includes a rigid cylindrical shell 26, a rigid end wall 27 which is fixed to one end of shell 26, and an end cap 28 which is attached to another end of shell 26 via a frangible seal 29. A rigid partition 31, fixed to the inside surface of shell 26, divides housing 22 into a propellant chamber 32 and a bag chamber 33. A rigid gas tube 34 is secured in an opening in partition 31. Tube 34 extends between the far ends of chambers 32 and 33 so that propellant gases generated in chamber 32 may flow well into chamber 33 and bag 23.

A suitable propellant 41 is located in propellant chamber 32. Propellant primer 25, also located in chamber 32, is mounted on the inside surface of wall 27 and includes initiating lead wires 36 that extend from primer 25 to the exterior of housing 22 through a sealed passage in wall 27.

In the uninflated position (see FIG. 1A), bag 23 is completely contained in chamber 32. Bag 23 is formed from a flexible, impervious material that has a single opening the perimeter of which is firmly fixed and sealed to the inside surface of shell 26 near one end of chamber 33. End cap 28 is preferably cemented to the outside surface of bag 23 to prevent cap 28 from becoming a dangerous projectile during deployment. Additionally, with cap 28 attached to bag 23, the momentum of cap 28 and its pull on bag 23 will help in ejecting bag 23 out of chamber 33, thereby insuring rapid and proper bag inflation.

A pressure-relief valve 37 is mounted on shell 26. Relief valve 37, which communicates with bag chamber 33, serves as a vent for propellant gases entering bag 23 during inflation. By adjusting the operational pressure of relief valve 37, the inflation rate of bag 23 is regulated. Concerning the rate of bag inflation, it is noted that conventional automobile air bags usually inflate within milliseconds. Such high-inflation rates are not necessary or even desirable in most of the applications contemplated for the present invention.

Operation of confinement device 21 is as follows: Device 21 is first placed in an appropriate location in a manner to be described below in detail. A suitable initiating signal is then applied to wires 36 to energize primer 25 in a conventional manner. The initiating signal may be applied manually or automatically as will also be discussed below in detail. After primer 25 is energized, propellant 41 burns to produce an inflation gas that flows through tube 34 into chamber 33. When the pressure in chamber 33 increases to a first predetermined pressure level, the resulting force on cap 28 causes frangible seal 29 to fracture. At this point, cap 28 is propelled away from shell 22, helping to eject bag 23 from chamber 33, while the inflation gases fill the interior of bag 23. As the propellant 41 continues to burn, bag 23 continues to inflate until reaching a second predetermined pressure level that is higher than the first pressure level. At this point relief valve 37 opens to permit vent gases to escape. When propellant 41 is consumed, valve 37 closes and bag 23 remains fully inflated at or just below the second pressure level. Instead of having valve 37 close as just described, it may be desirable for valve 37 to remain partially open to permit gradual deflation of bag 23. It is contemplated that a plurality of confinement devices 21 when deployed in a region will have the combined effect of temporarily immobilizing most or all objects in the region until appropriate action is taken.

Figure 2:
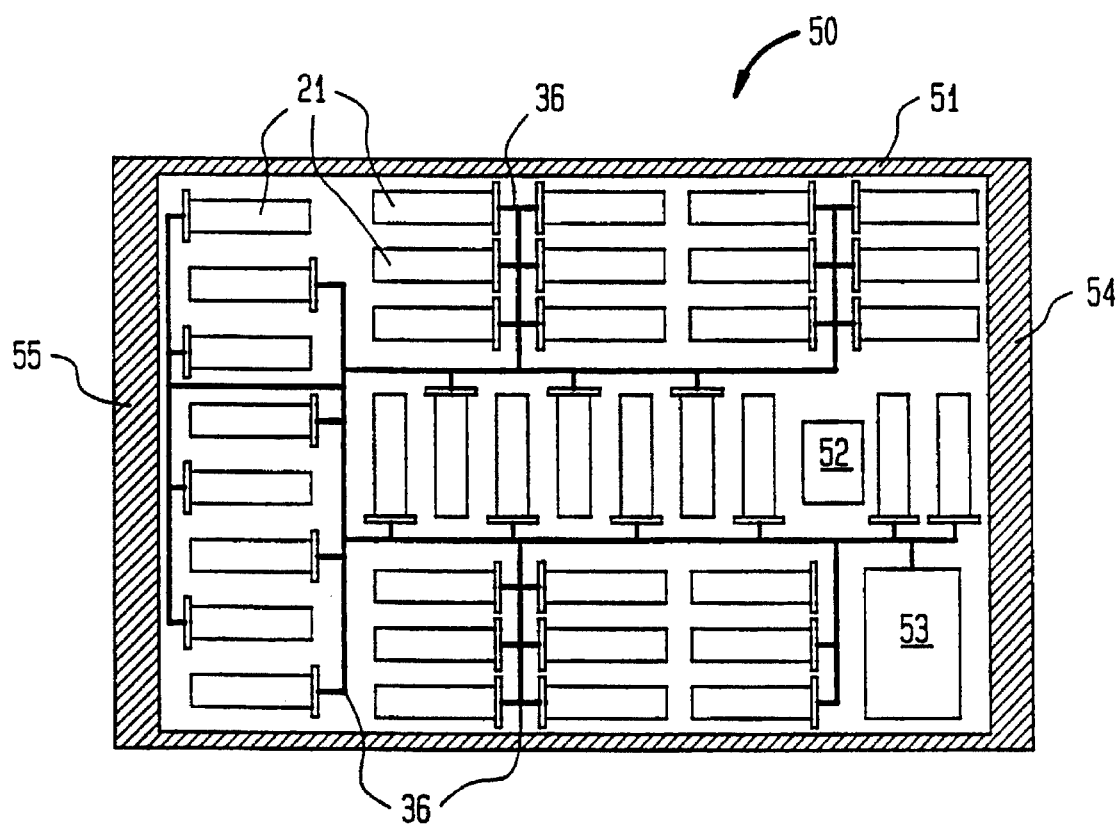
FIG. 2 is a cross-sectional elevation of a preferred embodiment including an assembled combination of the devices shown in FIG. 1A.

FIG. 2 illustrates a preferred dispersion package 50 for dispersing and deploying a plurality of confinement devices 21. FIG. 2, which is a cross section of package 50, shows only those devices 21 that lie in the cross-sectional plane. It is understood that package 50 will usually consist of a compact assembly of devices 21.

The shape of package 50 depends to a large extent on its application. Because package 50 is illustrated herein (see FIG. 3) as being part of a projectile, package 50 is shown with a cylindrical wall 51 and planar end walls 54, 55. Of course, other configurations are contemplated.

The devices 21 are placed in package 50 along with a detonator 52 and a trigger 53. Wires 36 are connected to trigger 53 which may be any conventional mechanism capable of triggering primer 25. Likewise, detonator 52 may be a conventional detonation device capable of producing a small discharge when appropriately energized.

When detonator 52 is energized, its resulting discharge ruptures one or all of walls 51, 54, 55 and explosively disperses devices 21 over an appropriate target area. Wires 36, preferably made of frangible material, easily break under the force of the detonator discharge, thereby permitting devices 21 to be dispersed. Detonator 52 may be energized remotely and/or automatically in response to some predetermined action. For example, when used as part of a projectile (see FIG. 3), detonator 52 may include a negative-g switch that will cause it to be energized when device 21 decelerates. Trigger 53 may be a battery or other voltage source that is capable of triggering primer 25 when it is disconnected therefrom, as occurs when wires 36 break at detonation.

Alternatively, detonator 52 may include a remote-controlled energizer to afford remote operation, or it may include a sensor-controlled energizer to afford automatic operation. Conventional remote-controlled energizers that are responsive to radio signals are ideal for many of the contemplated applications. Conventional sensor-controlled energizers that can detect motion, e.g. infrared sensors or Doppler radar sensors, are ideal for automatic operation.

Figure 3:
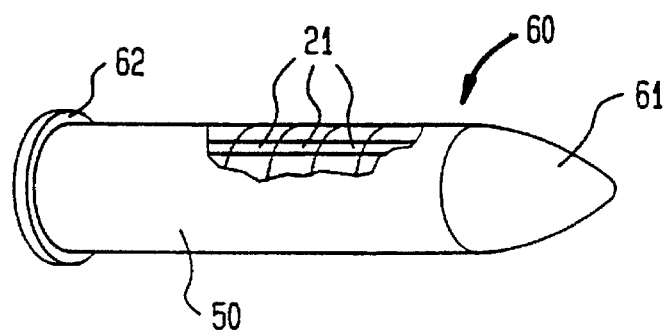
FIG. 3 is a pictorial view, with parts broken away, showing another preferred embodiment that uses the device shown in FIG. 2.

FIG. 3 shows a projectile 60 formed from package 50 by adding a nose cone 61 at one end and a flange 62 at the other end. Flange 62 acts as a conventional gas seal when projectile 60 is fired from a gun barrel. FIGS. 4A-4D show elements 21 being deployed in a closed room 70 via projectile 60 after it is fired from a recoilless rifle 71 by a soldier 72 located outside room 70.

Figure 4A:
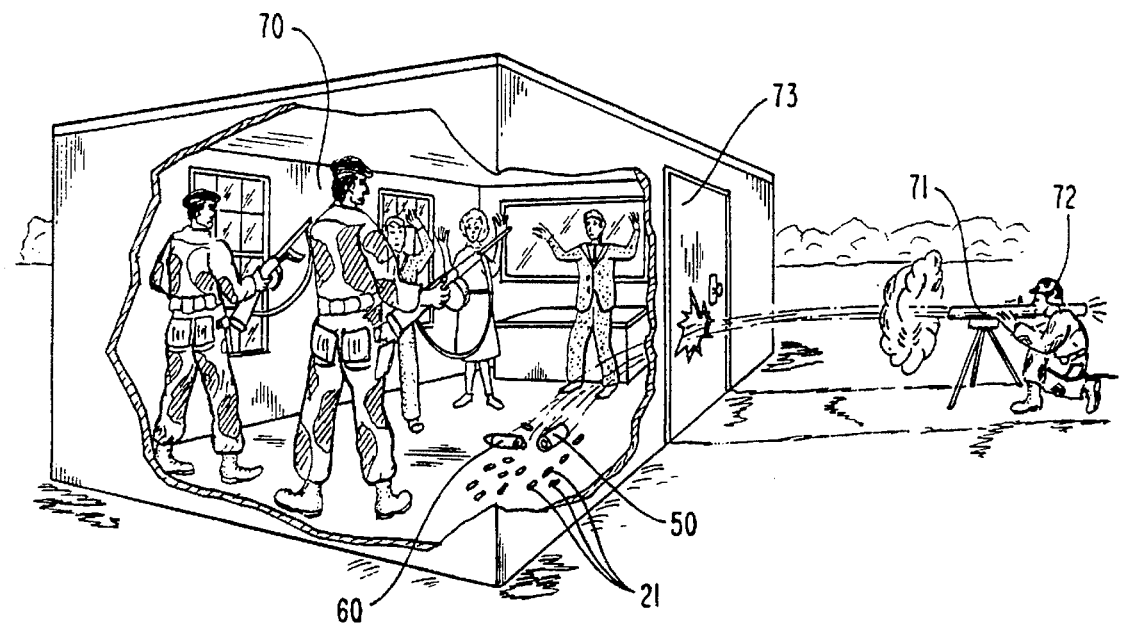
FIGS. 4A–4D are pictorial views, with parts broken away, illustrating placement of the device shown in FIG. 3 and deployment of the device shown in FIGS. 2.
Figure 4B:
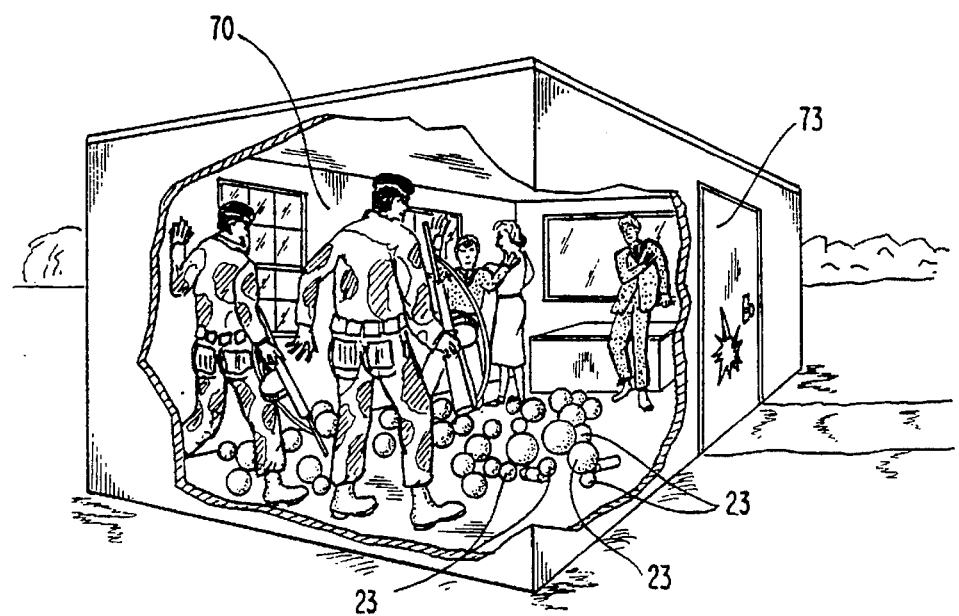
Figure 4C:
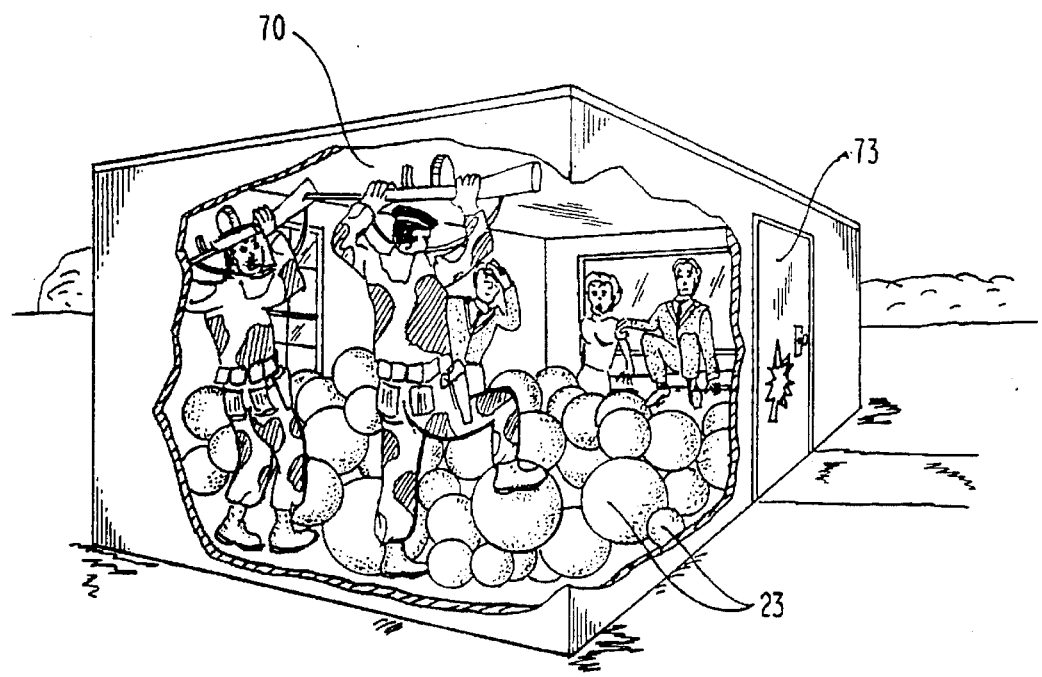
Figure 4D:
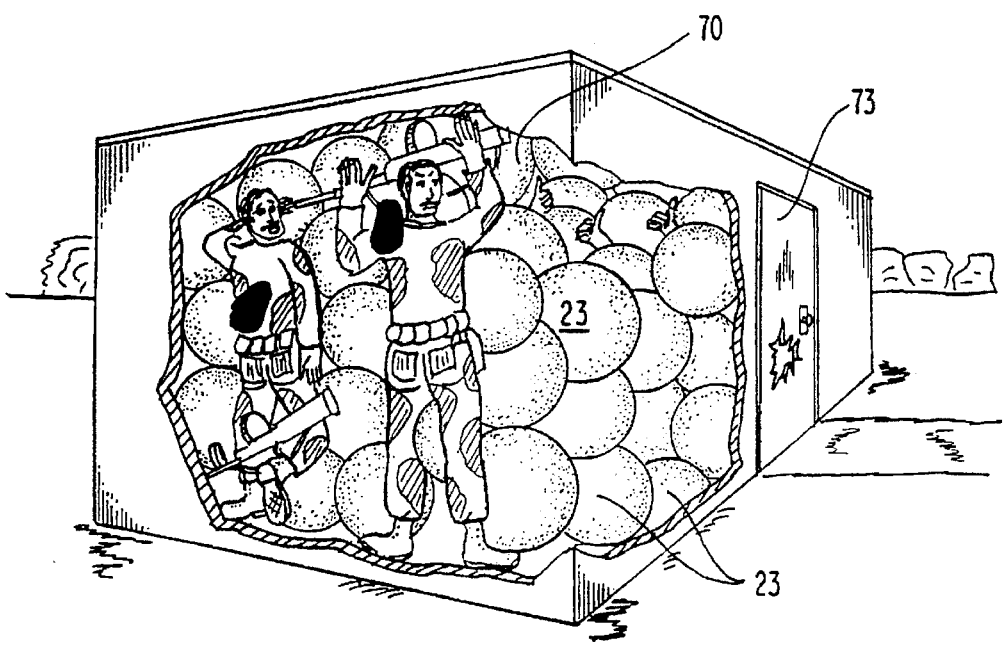

FIG. 4A shows projectile 60 coming to rest in room 70 after passing through a door 73. Package 50 is shown fragmented, a result of detonation by detonator 52, with elements 21 dispersed on the floor of room 70. FIGS. 4B-4D show various stages of bag inflation and the effects on the occupants of room 70. It is contemplated that, for use in rescuing hostages from a closed room, the time required to perform the sequence of events illustrated in FIGS. 4A-4D should be on the order of one or two seconds. As such, the detonation, triggering and inflation rates should be set accordingly. For example, the explosive dispersion of elements 21 by detonator 52 may take place in a fraction of a second. The inflation of bags 23 may take place in the order of one second.

Figure 5A:
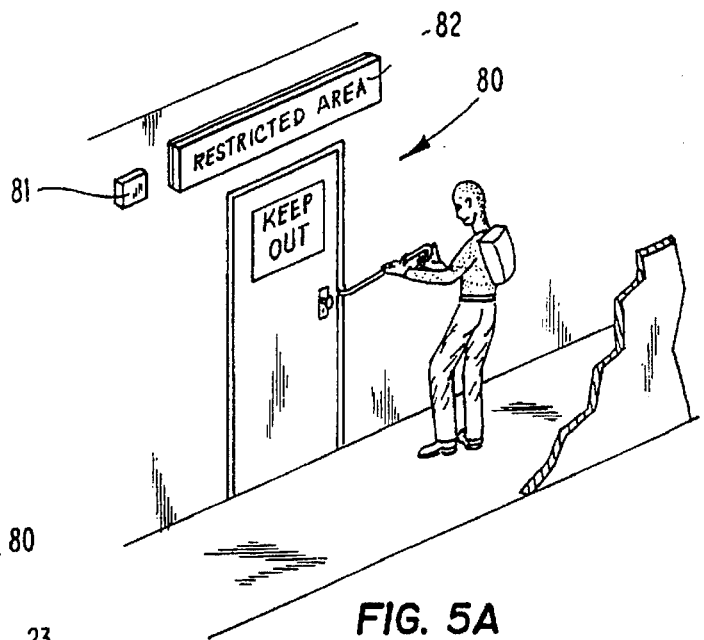
FIGS. 5A–5C are pictorial views illustrating deployment of the device shown in FIG. 2 from a pre-emplaced position.
Figure 5B:
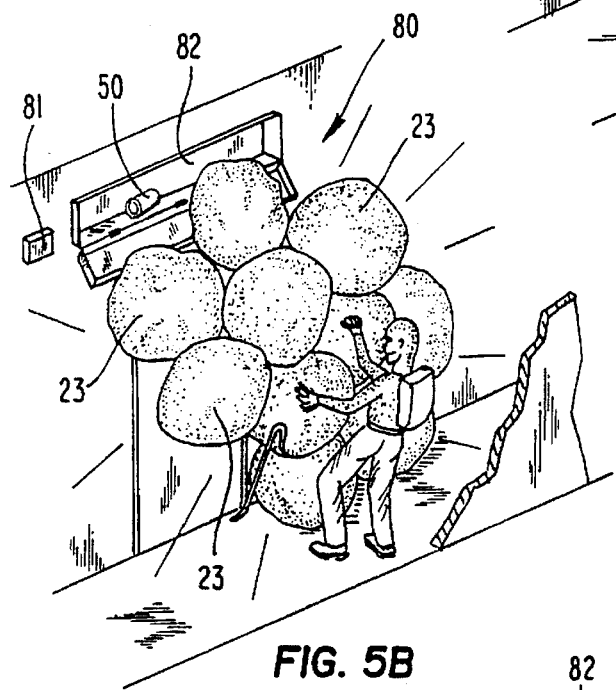
Figure 5C:
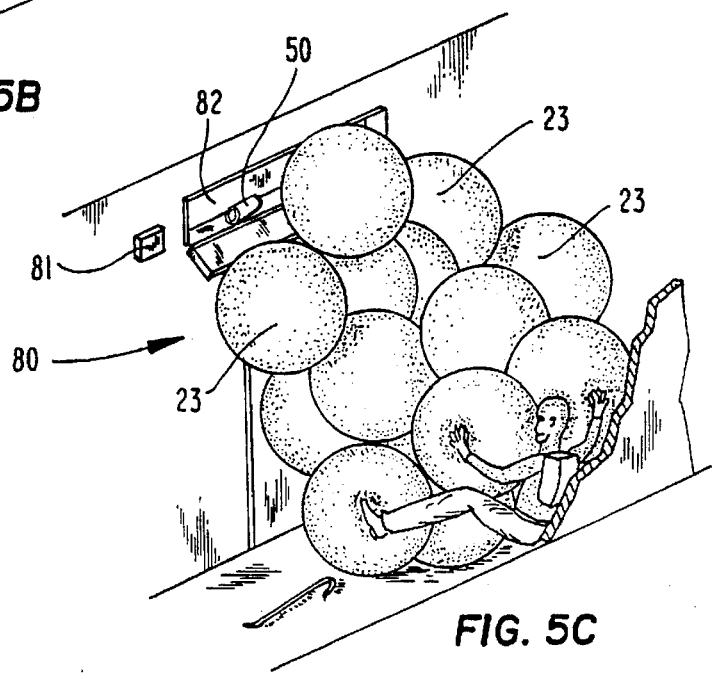

FIGS. 5A-5C illustrate the use of the restraining technique for preventing access to a restricted area 80. In this example, package 50 is pre-emplaced in a concealed location 82 at the area to be protected. Remote deployment of devices 21, e.g., by sending a radio signal, may be performed by an operator who is monitoring the area from a remote location via a video network. Alternatively, a motion sensor 81 may be used to afford automatic operation as discussed above.

Although preferred embodiments of the present invention have been shown and described in detail herein, many other varied embodiments that incorporate the teachings of the present invention may be easily constructed by those skilled in the art. For instance, embodiments are contemplated in which detonator 52 is eliminated and dispersion is accomplished via trigger 53. In this example, trigger 53 may include a radio receiver that, after receiving a proper radio signal from a remote operator, applies a trigger signal to wires 36 that energize primers 25. The resulting inflation of bags 23 would then fracture package 50 and disperse devices 21. As an added dispersion feature, those devices 21 that are located in the center of package 50 may be designed to inflate milliseconds before the other devices 21. As such, the more rapid inflation of the center-located devices 21 will help to spread the other devices 21 before they begin to inflate.

For pre-emplaced systems that are intended to impede entry into secure areas (see FIGS. 5A–5C), a pressurized gas feed system using compressed gas may be applicable for providing inflatable deployment where pyrotechnic inflation is not desirable or feasible. The material of air bag 23, being operationally dependent, may be made of various materials, e.g., polymers, natural rubber, woven fabrics, etc. In some cases, the hot inflation gases may be damaging if applied directly to the bag material at close range. In this regard, it is contemplated that a small portion of bag 23 that is fixed to end cap 28 may be removed to expose the underside of end cap 28 to the bag interior. As such, the hot inflation gases leaving tube 34 will initially be applied directly to end cap 28 rather than to the bag material, thereby avoiding damage to bag 23.

Bags 23 may take on a variety of shapes and sizes, even when used in the same package 50, to improve effectiveness. Elongated shapes that are straight, crocked or twisted are contemplated in addition to the round and spherical shapes shown on the drawings. As mentioned above, relief valves 37 will often be set to deflate bags 23 either immediately after bag inflation or after some predetermined delay to permit proper access to the area in which they are deployed.

In this regard, it is also contemplated that those bags 23 in a common package 50 may also be Set to deflate at different rates.

Chemical adjuncts, such as smoke, riot control chemicals or anesthetics, can be readily employed by those skilled in the art to improve operational effectiveness. In some applications, operational effectiveness may be improved by applying rapid-curing adhesives to the outer surfaces of bags 23. These adhesives could act to cause bags 23 to adhere to each other to form a more rigid unit, or they could cause bags 23 to adhere to the objects being restrained.

It is therefore to be understood, that the foregoing disclosure and drawings are merely illustrative of the principles of this invention and are not to be interpreted in a limiting sense. It is to be understood that the invention should not be limited to the exact details of construction shown and described because obvious modifications will occur to a person skilled in the art.

What is claimed is:

1. A method for rescue of persons where a first group of persons are under threat of hostile action by a second group of persons and the first and second groups are situated within an enclosed volume, the method comprising gaining control of the enclosed volume by the steps of (a) creating an entry into the enclosed volume by the steps of (a) creating an entry into the enclosed volume (b) rapidly and randomly dispersing a plurality of independent, inflatable, volume displacement devices in the enclosed volume through said entry, (c) inflating each of said devices by igniting a propellant contained within each of said devices, to substantially fill the enclosed volume and surround the persons in the enclosed volume with the devices and (d) maintaining the inflated devices for a sufficient period of time to effect rescue operations.

2. The method of claim 1 where the rescue operations include entry of a rescue team, removal of the displacement devices and taking the second group into custody.

3. The method of claim 1 where the devices are contained in a projectile, the projectile penetrates a side of the enclosed volume and the devices are then dispersed inside the enclosed volume.

4. The method of claim 1 where the enclosed volume is a building.

5. The method of claim 1 where the devices push against and restrain the persons in the enclosed volume.

* * * * *